United States Patent [19]

Lennartsson

[11] Patent Number: 5,371,859
[45] Date of Patent: Dec. 6, 1994

[54] SYSTEM FOR PROVIDING DATA COMMUNICATIONS BETWEEN A PLURALITY OF MEASUREMENT DATA GENERATING/RECEIVING MODULES CONNECTED TO A COMMON COMMUNICATION BUS

[76] Inventor: Kent Lennartsson, Ostergardsgatan 1:20, 2-212 22 Malmo, Sweden

[21] Appl. No.: 910,268

[22] Filed: Jul. 20, 1992

[30] Foreign Application Priority Data

Jan. 22, 1990 [SE] Sweden .................... 9000212

[51] Int. Cl.$^5$ .............................. G06F 13/36
[52] U.S. Cl. .................... 395/325; 364/132; 364/242.8; 364/DIG. 1
[58] Field of Search ............ 395/325, 725, 200; 364/132, 242.8, DIG. 1

[56] References Cited

U.S. PATENT DOCUMENTS

| | | | |
|---|---|---|---|
| 4,373,183 | 2/1983 | Means et al. | 395/325 |
| 4,470,110 | 9/1984 | Chiarottino et al. | 395/200 |
| 4,965,716 | 10/1990 | Sweeney | 395/325 |
| 5,086,385 | 2/1992 | Launey et al. | 364/188 |
| 5,103,391 | 4/1992 | Barrett | 364/133 |
| 5,260,875 | 11/1993 | Tofte et al. | 364/424.07 |

Primary Examiner—Allen R. MacDonald
Assistant Examiner—Glenn A. Auve
Attorney, Agent, or Firm—Pollock, Vande Sande & Priddy

[57] ABSTRACT

A system provides data communications between measurement data generating/receiving modules connected to a common communication bus. A master station connected to the communication bus can assign access priority to various message data structures generated by each of the modules connected to the communications bus. As modules are added or subtracted from the total system, the master station can reassign priorities to each of the message data structures generated by the modules. In this way, bus traffic can be efficiently controlled with the ability to dynamically change priority of message data structures which are sent over the bus by the various modules. A transmission delay time is also assigned to each of the message data structures which requires that a time out period following the last data message to be sent over the bus be observed before transmitting the new message data structure. The different delays VT are related to the particular priority of a message data structure.

19 Claims, 3 Drawing Sheets

# SYSTEM FOR PROVIDING DATA COMMUNICATIONS BETWEEN A PLURALITY OF MEASUREMENT DATA GENERATING/RECEIVING MODULES CONNECTED TO A COMMON COMMUNICATION BUS

TECHNICAL BACKGROUND

The present invention relates to a distributed control system with function-controlling units which are connected or connectable to a connection via internal or external communication elements allocated thereto. The units can communicate with one another by means of these communication elements or by means of message transmissions. The units obtain access to the connection one at a tee and in a queue order which is dependent on the priority of the messages in the control system and/or how the messages occur at the connection. One or more units can be set for reception of messages with predetermined priorities. A unit which is to transmit over the connection having a message with a higher priority gets at least a certain precedence to access the connection over a unit with a lower message priority. The units can also be addressed with the message priorities. One or more first statements (information items, data and so forth) on control, measurement and/or sensing and so forth are attached to the respective message. The control system is set up with a first affiliation allocation of the first statements to the different messages which means that said first statements also become mutually prioritised in the system.

PRIOR ART

The invention is preferably applicable in distributed control systems which comprise units which executes their own functions to control objects in a machine or in systems which form a production or guidance control system. In qualified control it is essential to be able to arrange the machine/system as free of disturbance as possible without needing to utilise complicated/expensive wiring, disturbance elimination functions and so forth. The function-executing units are therefore suitably placed in physical proximity to the function-executing objects so that short wiring becomes possible between the units and the objects. Such machines/systems have already been known.

The units are connected or communicate with one another by means of a data communication connection with few wires message transmission occurs in such a manner that the units can be initially set and receive information items which will operate the system. The message transmission will be such that certain functions can be prioritised before others in the system based on their significance in the system. Distributed control systems with such communication connections have been known.

Distributed control systems of the so-called multimaster type have already been known. In such systems, there is no actual higher-priority unit but all units have the same status in the system. In such systems, the units can communicate with one another and obtain access to a common connection in accordance with different principles, for example the random access method. Distributed control systems with higher- and lower-priority units (master and slave units) have also been previously known. In such systems, the access of the units to the connection is controlled from a higher-priority unit (computer).

Computer equipment, which, per se, comprises units which can communicate with one another, or higher- and lower-level units which effect the message exchange via a bus connection have also been previously known.

It has also been previously know to arrange the units in a common rack and to connect the units to the objects via long noise-sensitive connections which are difficult from the point of view of wiring and noise elimination.

SUMMARY OF THE INVENTION

There is a marked need to produce, in a system in which priorirising occurs by means of the messages themselves to increase the effectiveness and the quality in function execution of the system without creating a demand for a complicated and expensive wiring/connection between the units. In other words, the control system will be concentrated on the most important events in the process.

The need will be met in a message-controlled system, that is to say a system in which the units are controlled by the message priorities instead of their physical addresses in the system.

There is also a need for a system of the type specified, in which the units communicate with one another whilst retaining a data communication connection of a simple configuration. Thus, for example, a connection with few wires will be utilized, in which two wires/conductors are included for signal transmission/message transmission and in which a voltage reference (earth) and a possibly shielding is provided. The shielding will prevent signal interference from penetrating or escaping the connection.

It will be possible to utilise the increase in effectiveness for improving the characteristics of the system. Increasing the effectiveness makes it possible to manage high loading with an increased number of messages per time unit. The transmission speed can also be lowered without overloading the communication arrangement. The transmission and the transmission speed can provide less expensive/more technically simple cables, the electronics for transmitter and receiver can be made simpler, the same equipment items can be utilised for transmitting over longer distances, the probability of errors in transmission can be reduced and so forth. A relatively low bit speed can thus be offered, among other things. Alternatively, the increase in effectiveness can be used for obtaining a dynamic adaptation to critical events occurring in the system which can occur at the expected moment or due to events which occur in the function execution (feedback functions). The invention offers the possibility of managing several time-critical messages. In addition, faulty and/or interfering units can be taken out of operation or their priority can be reduced.

It will be possible to use the increase in effectiveness to ensure transmission time with transmission of important statements, parameters, statuses, functions and so forth between units in the system. It may thus be important to allocate a guaranteed transmission time to a message.

The system events can be prioritised according to predetermined rules for normal cases in the system. When unexpected or expected fast events occur in the system, intermittent or continuous redistribution of the priorities will be able to take up space. In a case where trigger signals/fast signals occur expectedly or unexpectedly, it will be possible to allocate to these signals a second priority which is more long-term or which overrides slowly occurring events.

Priority redistributions will also be able to prevent overloading of the system and redistribution of the priority will be possible in operation and/or in start-up phases utilized.

If necessary, it will be possible to arrange the system in such a manner that the most critical statement is given highest priority. With low or lower loading in the system, it will be possible to provide a message with low or lower priority with a relatively faster progress in the system.

The invention will also facilitate system production/system design and subsequent modification or exchange of the system and its units.

It is the object of the present invention to wholly or partially solve the complex of problems specified above. Among other things, it is a be considered to be characteristic of the invention that the control system enables transmission of a first statement from one unit to one or more other units during execution of its function and, due to a change in function, status, configuration and so forth of the system, or one or more of its units, to change the priority of the first statements in the system. The priority is changed according to one or both of the following alternatives. In the first alternative, a second affiliation allocation is provided for the respective first statement. The respective change in priority is effected by the first element which produces a priority redistribution message which preferably has overriding priority with respect to access to the connection. The units set themselves or stay in receiving mode(s) with the occurrence of the priority redistribution message at the connection. The priority redistribution message includes a second instruction for the respective first statement, affected by the priority redistribution message, about the priority condition which is to apply to the first statement after the change. The respective unit is also arranged in such a manner that on or after reception of a priority redistribution message, it is adjustable for reception and/or transmission in accordance with the new priority condition. The second alternative utilises delay functions. The respective message/first statement of preferably a plurality of messages/ first statements, is prevented from occurring again at the connection within a certain time after its respective occurrence at the connection. The system is thereby arranged with or programmed for a memory function for delays for different messages/first statements. Other elements determine on the basis of the memory functions to what extent the delay time for a delayed message/delayed statement has expired or not expired when a unit wishes to transmit/receive the message/the first statement in a case where it is at the same time the turn of a message/first statement of lower priority to obtain access to the connection.

In further developments of the concept of the invention, it is proposed that the control system is provided with programming elements which can be manually operated or can be operated by diskette or other data-carrying medium. The programming element(s) is (are) used for entering one or more instructions about a new distribution of affiliation of the first statements. The respective instruction can be used thereafter to control the elements which generate the respective priority redistribution message. This facilitates configuration or modification of the control system as such. Said modification can be relevant in connection with an addition or removal of a unit in the control system. Said modification can also be relevant with fine tuning of the system, starting from a basic function (coarser function) programmed into the system.

In a preferred embodiment, the control system, for example one or more of its associated units, operates, by means of one or more feedback functions, objects controllable from one or more of the units in the system. A new affiliation distribution for the respective first statement to the respective message can be initiated by one or more feedback functions/feedback information items between the respective object and unit. The control system can be of the type which operates with start-up and operating phases. In this manner, a first affiliation distribution can be present at the beginning of the start-up phase and other affiliation distributions are introduced in the start-up phase. Furthermore, third affiliation distributions can be effected in one or more operating phases which follow the respective start-up phase. The third affiliation distributions can occur in accordance with a system of rules which is present in the system, said instructions or due to one or more feedback functions between the control system and one or more objects controllable by the control system by means of the units.

A priority redistribution message can preferably be sent out at the beginning of a start-up phase and when this message occurs at the connection, all units set themselves to receiving mode and listen for a message with the highest priority which can be constituted by said priority redistribution message. On sending out of a priority redistribution message, affected units receive information about their affiliation distributions and those of other units and the respective unit adjusts itself to its own affiliation distributions and those of other units.

In a preferred embodiment, the control system and its units are constructed in such a manner that a respective unit can be separately developed or purchased for later or separate application in the system. This, in turn, can be separately developable in relation to the respective unit without requirement for knowledge of its exact operating function for carrying out the control system requirement for the unit. The control system thus only needs to have or provide a statement/statements about the general or overriding function of the respective unit. Thus, the system does not require any statements on how the unit per se operates or carries out the task in order to fulfill the functions which the unit, seen externally, will fulfill in order to be able to be accepted in the control system.

In one embodiment, the units are completely controlled by the messages, that is to say by the number or priority of the messages instead of by their physical placements in the system. In an initial function period, for example in a start-up phase, an initial affiliation distribution can be effected by means of a statement, at least in an initial priority allocation message, about the physical placement of the units in the system.

In another embodiment, all priority redistribution messages can contain different statements, which, for example can consist of a statement intended for a physical address/unit address and a statement for the other units affected, which are affected by the message/messages in question. A second statement can relate to serial priority redistribution which means that an affected message contains statements to the effect that the priority redistribution will occur in accordance with a particular pattern in which the priority redistributions follow after and possibly depend upon one another.

In a preferred embodiment, a priority redistribution message is utilised which is intended for all units, possibly with the exception of the sending unit. This priority redistribution message can contain statements to the effect that the units will go back to their original affiliation distribution. This original affiliation distribution can have been obtained, for example, in a start-up phase utilised in the system.

By means of what has been proposed above, it is possible to retain the simple configuration of a data communication cable in control systems belonging to this category. The freedom of choice to build up the control system becomes prominent. The control system can be developed separately by system designers and manufacturers of units which can be incorporated in a simple manner into the system. The system designer can also build systems with units of different manufacturers. He/she can build. The system is built starting with existing units and no special development of units will be needed from the side of the system designer. The programming functions are suitably arranged in such a manner that the basic system parameters are introduced from the beginning in the system program. The system is thereby arranged with a supplementary program in which supplementary instructions can be introduced with respect to modifications, variant configurations which will be provided for the system as such and so forth. The invention can be utilised on machines and in systems which require a distributed control system for controlling their components, machine parts and so forth. Examples of application of the control system can be robot systems, weaving machines and other production machines and so forth. Time-critical messages can receive preference and reach their destination within the desired time frame with high probability. Messages can be sent within guaranteed times at different priority levels. The system can operate with a restriction that when a message is transmitted from or to a unit, the unit will not send or receive further messages within a predetermined time, during which time messages with lower priority can be transmitted.

The new arrangement can be utilised in systems which basically are configured around a data communication arrangement which is serial. However, several such serial data communication arrangements which are wholly or partially in parallel with one another may be implemented. The reason for this can be to increase the transmission capacity or to obtain redundancy. In the case of redundancy, the data transmission occurs in parallel but the cables can normally run along physically different routes to prevent both from being knocked out by mechanical damage. There is preferably only one higher-level unit (master) which handles allocation of resources during communication in order to ensure that a message with the same priority is not transmitted from two units at the same time. However, implementation can be carried out by several different units. Adjustment can be done in advance through programming by the person responsible for the system. A message can be coupled with first statements in the form of digital data which will be transferred from one unit to one or more other units. It is desirable in an optimisation of the number of messages in the communication, whilst retaining reliability, that the most important statements progress within predetermined time frames. This can be obtained by grouping certain messages and by providing them with a pause condition between each transmission of a message within the group, and by providing the possibility of movements of first statements, which are to be transmitted, to and from a message within this group. A quite dynamic system can be obtained if there is a start-up period when the connecting units only need to be able to receive a predefined message with associated second statements, which identify which message will be used in order to transmit other first statements. Third statements for ensuring the transmission itself in the system can also be included.

The invention provides the possibility of communication in which a message is transmitted with priority and that this is normally only a message which has a guaranteed transmission time. In one embodiment it is desirable to obtain more than one message with this guaranteed transmission time. This guaranteed transmission time is selected to be as short as is demanded by the system. In this connection, it is also desirable to use as low a bit frequency as possible. A low bit frequency results in less expensive cables and electronics in the transmitter and the receiver. It also results in the possibility of transmitting over longer distances and the probability of errors is reduced. Many of these demands are contradictory, that is to say when one is improved, another characteristic deteriorates. However, an optimum solution to these problems can be obtained by means of the solution described.

DESCRIPTION OF THE FIGURES

In the text below, an embodiment, being proposed for the time being, of an arrangement which exhibits the significant features of the invention will be described, referring at the same time to the attached drawings in which:

FIG. 8 shows registers which each message must be allocated to so that it can transmit and receive correctly first statements; and, FIG. 9 describes a set of registers with data which are transmitted when a number of first statements are to change messages.

DETAILED EMBODIMENT

According to the illustrative embodiment a distributed system is coupled together with a data communication arrangement in which a respective message can be transmitted with a unique priority allocated to it in the system (priority level). This makes it possible for time-critical first statements which are coupled to the messages to receive preference in the communication and have a high probability of reaching their destination within a desired time frame. The lower the priority of the message with associated first statement(s), the more difficult it is to estimate whether the first statement will reach its receiver within a desired time frame. The delay of a message/first statement depends of course on how many messages/first statements of a higher priority are being transmitted and how often they are sent.

The problem is described in the following example where it is assumed that all messages/first statements 'M' take 0.5 ms to transmit. This provides the following guaranteed transmission times. The symbol 'AX' is the number of times a message/first statement with priority 'X' is transmitted in the time in which a message/first statement with specified priority will be transmitted. The symbol G gives the maximum delay due to the fact that a message/first statement is already being transmitted. This provides the following table:

| Prio | wait Equ. | Wait Time | Wait one sending |
|---|---|---|---|
| 0 | G + M | <1 ms | <1 ms |
| 1 | G + A0*M + M | >0.5 ms | <1.5 ms |
| 2 | G + (A0 + A1)*M + M | >0.5 ms | <2.0 ms |
| 3 | G + (A0 + A1 + A2)*M + M | >0.5 ms | <2.5 ms |

As can be seen, only a first message/first statement has a guaranteed transmission time. The rest are based on how often messages/first statements with higher priority are transmitted, that is to say the value given to A0, A1 and so forth. By introducing a wait time 'VT' for some of the-messages/first statements with the highest priority so that a message is not sent back within this time, several messages/first statements with maximised transmission time are obtained since A0, A1 and so forth become maximised to 1. The result can be seen in the next table.

| Priority | Wait Equation | VT (ms) | max delay |
|---|---|---|---|
| 0 | G + M + VT | 10 | <11 ms |
| 1 | G + M + VT + A0*M | 9.5 | <11 ms |
| 2 | G + M + VT + [A0 + A]*M | 9.0 | <11 ms |
| 3 | G + M + VT + [A0 + A1 + A2]*M | 8.5 | <11 ms |

VT is preferably made so large that all messages/first statements in the group will come to be transmitted within this time 'VT'. There are different ways for selecting VT in order to obtain a different weighting of messages/first statements to take into account also the expected loading on the communication arrangement. A special case of VT is where it is set so low compared with others in the group that this message can be transmitted two or more times within the maximum time. In the table it is selected for the maximum wait time to be the same for the number (for example 21) of first prioritised messages predetermined in the illustrative embodiment. It will be noted that all messages/first statements belonging to this group must all have higher priority than those which do not belong to the group in order for the condition to be met. Otherwise the priority lacks significance. The number of messages and bits in each message with associated first statements in the group must preferably be kept low if the maximum time is to be kept short. When a first statement is moved to a message outside the group, another first statement can use this or another unattached message in the group and thus become transmitted more quickly and reliably. The length of the total bit packet which includes message, possibly first and/or second statements and third statements bound to the transmission function in the system can be given a variable length, with the aim of making the messages/packets as short as possible. The number of bits for the first statements is preferably kept to a minimum.

In an illustrative embodiment, the units are coupled together with a communication line 100. Such a communication line frequently has few wires, that is to say one or two wires are used for signal transmission and a voltage reference (earth) and possibly a shielding may be utilised for preventing interference from penetrating and/or escaping the communication line. A communication line, is not limited to being communication on wires but an optical connection, a waveguide connection, and a connection by radio waves can also be used. On this communication line, information items are transmitted serially even if it can happen that, by modulating, several such serial channels can be transmitted at the same time on the same line. To distinguish between different messages or first statements which are transmitted on the line, these are provided with an identifier or destination address in one embodiment. In this manner, the receiving units can distinguish between a message/ first statements which will be received and those which are intended for other units.

Figure 1:
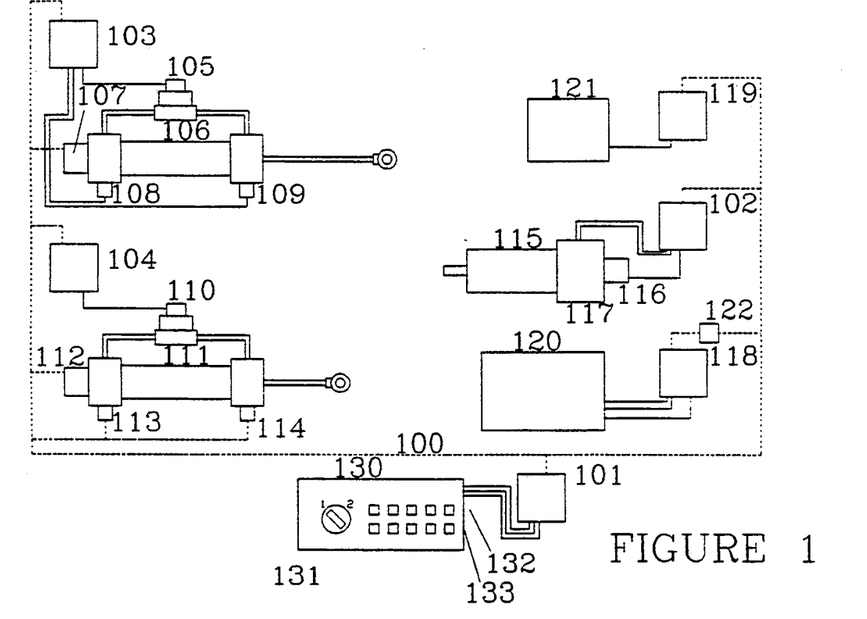
FIG. 1 shows a system configured in accordance with the principle of distributed units connected to a common data communication arrangement. In such a system, the arrangement can be used for increasing reliability in the transmission times and/or provide a possibility for using less expensive communication equipment.

In FIG. 1 a system is shown in which the function according to the novel arrangement is applicable. This system consists of a communication loop 100, to which is connected a plurality of, for example 6, complex units 101, 102, 103, 104, 118 and 119, two pressure transmitters 113, 114 and two position transmitters 107, 112. The system comprises three positioning units, one brake 119 and one temperature control 118. The most common component in a machine is one which creates some form of movement, which is why this fact is used in the description. A connected unit can, however, control other items such as brake, temperature, pressure, flow, among others. Two of the units control hydraulic cylinders 106, 111 and the third unit 1/2 controls an electric motor 115. The figure does not show the operated objects drawn but these can forth part of a known machine. Hydraulic cylinders 106, 111 are controlled by the control units 103, 104 via control valves 105, 110. Position transmitters 107, 112 and pressure transmitters 108, 109, 113, 114 are used for feedback. The advantages with a distributed system are that short lines between information-providing (transmitters) and information-receiving units(s) can be achieved, which is particularly important when the signals are of analog type. The signals which are to be transmitted over longer distances or to several units are suitably coupled to the communication line in order to be accessible by this means to all units connected to it. An example of this are position transmitters 107, 112, the information from which is important to the units which control for a desired position, but it can also be important for the overriding control in unit 101 to ensure that the desired position is reached. Said unit 101 consists of a master unit which at least operates with a function which checks that communication is functioning and which, if necessary, moves first statements between different messages with the aid of second statements. Said unit 101 can also operate with another function which provides control commands and control parameters to connected units and checks that these orders are carried out in a correct manner. For an operator to be able to check the system, a control panel 130 is utilised which is connected to or forms part of the unit 101. Via communication line 100, the units can be read with the panel and/or new control commands can be issued. The unit or units 101, 130 can be of the personal computer type or of a simpler type with a few buttons and indicator lamps depending on which information will be transmitted to and from the operator.

Figure 2:
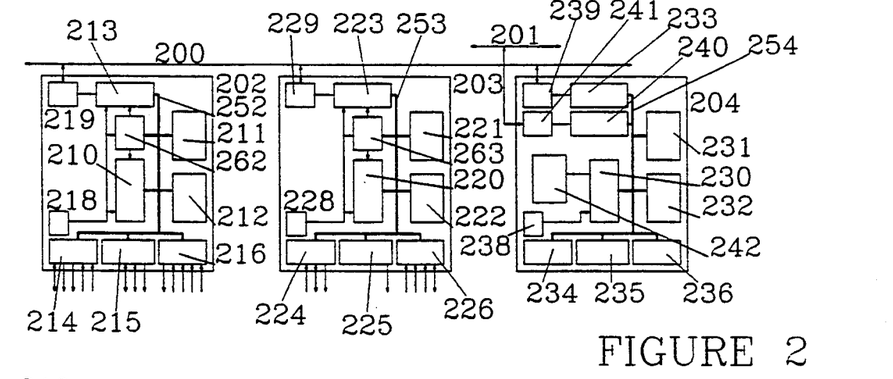
FIG. 2 shows a number of units connected to a serial communication arrangement and which has equipment of such type that prioritisation of a first message statement is possible and that second statements for resetting first statement(s) from one to another priority/other priorities can be received so that first statements can be transmitted with selected/desired messages. Units in FIG. 2 are equipped with special components for handling waiting times.

FIG. 2 describes three units coupled to a communication arrangement 200 which can be of the see type as the communication arrangement 100. The units consist of a processor 210, 220, 230, RAM memories 211, 221, 231, a further memory or other peripheral unit 212, 222, 232, adapting elements to external components 214–216, 224–226, 234–236, oscillators 218, 228, 238, serial communication circuit 213, 223, 233, 240 and adapting elements 219, 229, 239, 241 to the communication lines 200, 201. In the units 202, 203, there are also two units 262, 263, with registers which can be counted down with the aid of the clock 228, 238, which can be used for controlling the wait times. To couple together the components arranged on the unit, a computer bus 252, 253, 254 is used which is wholly or partially coupled to all components in the unit. The unit is identical with 203, which means that these two are exchangeable. However, it is not necessary to construct the units to be exchangeable in order to provide the possibility of reprioritising. The units 213, 223, 233 preferably meet a common minimum specification for serial communication so that the bit sequence sent out can be received by other units. This applies principally to the information about which bit frequency and which voltages will be used. The unit 204 contains a further element 241 which is coupled to another communication arrangement 201. The need for a further communication line can be based on the fact that different levels (priorities) are desired in the system, that speed requires a further serial communication arrangement or that two or more parallel serial lines are used in order to obtain redundancy in a system which will be error-tolerant, for example in military equipment. In unit 204, a further unit 242 connected to the processor is located, which can be, for example, a signal processor or a calculating unit for flow numbers. Certain of the components/functions can be put together on one and the same silicon chip or mounted in a capsule. In most cases, the adaptation arranged towards external units is, however, arranged in separate components since these can have large variations and in certain cases will handle a difficult electrical environment. The voltage feed is not included in the figure, but is supplied in accordance with known alternatives. Parts 214–216, 224–226, 234–236 can be of a digital or analog type both for the input and output signals. These can also contain necessary isolating items such as optocouplers, transformers and so forth.

Figure 3:
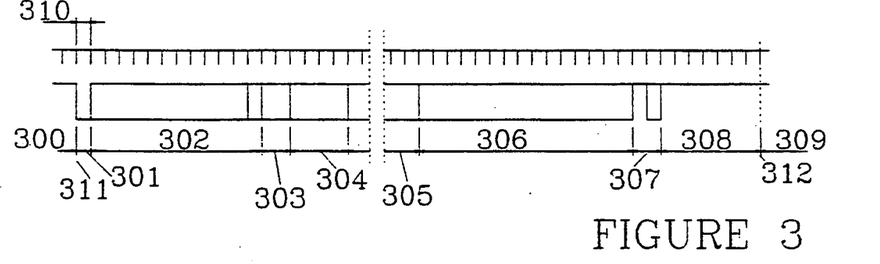
FIG. 3 shows how a bit packet comprising a message and first and second statements bound to it looks and can be transmitted from one unit to one or more other units.

FIG. 3 shows how a complete packet (comprising a message and first, second and/or third statements) of bits for transmission can be configured. In this case, a digital communication arrangement is provided which operates with two different levels, 1 or 0. Each such digit is called a bit and usually has particular length in time 310, at least transmitter and receiver must know where each bit is located in the packet so that a correct interpretation can be made in each receiver. When nothing is sent, one and the same digit is usually sent the whole time and, in the illustrative embodiment, the digit "1" 300 is utilised. A transmission starts with a start bit "0" 301. When this bit deviates between two packets from value 1 which is transmitted on the communication arrangement, it is made clear that a transmission has started. The start sequence can consist of other bits but a start of a packet is normally composed of only a single bit. The edge 311 of the start bit also acts as synchronisation for the whole system so that transmission and reception of bits occurs at the same time in the whole system. Reading of each bit usually happens as close to the center as possible in order to minimise the risk that a wrong bit is read. If the packet is long, the receivers are usually equipped with a possibility for resynchronising on the edges which come in the packet. In order to provide the possibility for synchronisation when only 1 or 0 is transmitted, the communication arrangement is usually equipped with "bit stuffing", that is to say if there are too many bits with the same value in a row, the transmitter inserts one bit with the opposite value. This occurs in accordance with particular rules so that the receiver can pick out these stuffed bits. After the start bit, a field 302 occurs with a number of bits which can be assigned to said second statements for clarifying which priority the packet has. The identification of the message affected is thus included. A method for obtaining prioritising is to let 0 be a dominant level, that is to say as soon as a unit transmits the digit 0 it becomes 0 in the communication arrangement. The other prerequisite is that all start the transmission at the same time. This means that as soon as a start bit is detected by a receiver, it is no longer permitted to start a transmission. If all start the transmission at the same time and the units transmitting read back the bit which they have just sent, the units which send a 1 and read back a 0 will break off the transmission of the packet. If the priority field begins with the most significant bit first, only the packet with the priority closest to 0 will be left over. Other transmitters will have broken off the transmission. In this case, it has been assumed that the priority field has a length of 12 bits. The next part in the packet consists of a number of bits 303 forming a third statement with system information, for example reset functions and the like. After that comes a bit field 304 which belongs to said third statements and describes how much subsequent data 305 will be transmitted. The last-mentioned data bits 305 form said first statements and are transmitted frequently in multiples of 8 bits in order to obtain whole bytes. The length of the data 305 can be variable. The number is suitably between 0 and 16 bytes or some other maximum number. The advantage with a variable number is that the length of the packet can be kept down in order to reduce the delay times in the system. A maximisation of the number of bytes is necessary in order to be able to calculate maximum times. The data 305 must be followed by some form of check sum 306 (forms part of said third statements) so that the receiver can obtain acknowledgement that the collected package is correct. This is most usually calculated in accordance with a CRC polynomial of the transmitter and is compared with the result obtained by the receiver when it performs the same calculation on the received bits. The number of bits in field 306 is based on which CRC polynomial is used but the length and the polynomial must be determined before communication is started. At the end the receiver can conceivably overwrite a transmitted 1-bit with the dominant 0, the last bit in 307 (forms part of said third statements) as acknowledgement that the receiver has received the packet. After the actual packet, there is an intermediate space 308 in order to make clear that the communication arrangement is free. At point 312 it is permitted to send out a new packet which should correspond to point 311 in the next packet. If no message/-first statements are to be transmitted at that instant, the level will remain at 1 until a unit wishes to transmit. This start of a next transmission may happen at any time after time 312. Since time 308 has a particular length, several transmitters can be started at the same time at point 312.

According to the description given above, a respective packet can be considered to include a message with associated first statements 305 about the system data which will be transmitted between the units. In addition, a priority statement is included which specifies the priority for the message. This priority statement is here designated quite generally as second statement(s). Other data belong to the category of third statements specified here.

Figure 4:
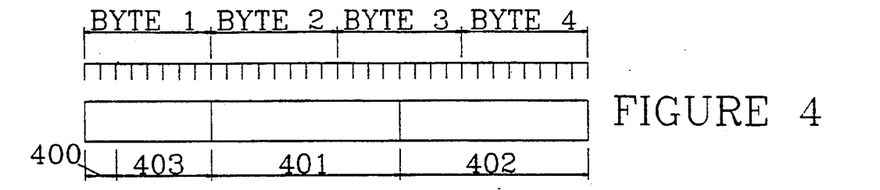
FIG. 4 shows data for a second statement for moving first statements from one message to another message.

FIG. 4 describes a priority redistribution message which utilises a variant of single statements which are transmitted so that a first statement can be moved from one message to another. In this case, the first 2 bits in field 400 specify that a change of message applies. The subsequent 6 bits can then specify the delay time to be applied between two transmissions of the new message. The subsequent 12 bits 401 specify the old message(s) and this is followed by 12 bits 402 with the new message(s) which will now be used. That is to say, the priority redistribution message means that the first statement or the first statements which have been transmitted earlier with an earlier message(s) will now be sent with one or more other messages. These statements can be received by all units which are connected to the communication arrangement, which means that the transmitting and all receiving units know at the same time which message will be used in the transmission of a respective first statement after the change or after a predetermined time after the change.

This exchange of a first statement between different messages is associated with a certain risk that the first statement concerned will be transmitted directly after the exchange has been carried out and that a packet for this is ready in a transmit buffer. This packet is then entered into the transmit buffer by means of the old message. If the electronics allow, the transmitting unit can break off the transmission and retransmission can be started of the first statement concerned with the new message. If this cannot be carried out, the packet will leave with the first statement(s) bound to the old message. The receiving units which have not adjusted will naturally receive the first statement bound to the old message. With high probability, however, the receivers will have already been adjusted to the new message, which means that the first statements sent out bound to a wrong message will not be received. For the first statements to be forwarded it is necessary that the transmitter carries out a retransmission with the binding of the first statement to the new message.

The first field 400 is not necessary if a change of message is transmitted by means of a special message. This is because, in this case, it is made clear which statement of which message is used in the transmission. In cases where the delay time is not used or where this is given in another way, the field 403 is thus not needed either, which means that the packet can be shortened by one byte. In a case where the priority field 302 becomes longer or shorter, the field 401, 402 can be lengthened or shortened by the same extent. It is possible that a second statement contains such data that it moves itself to a new message.

Figure 5:
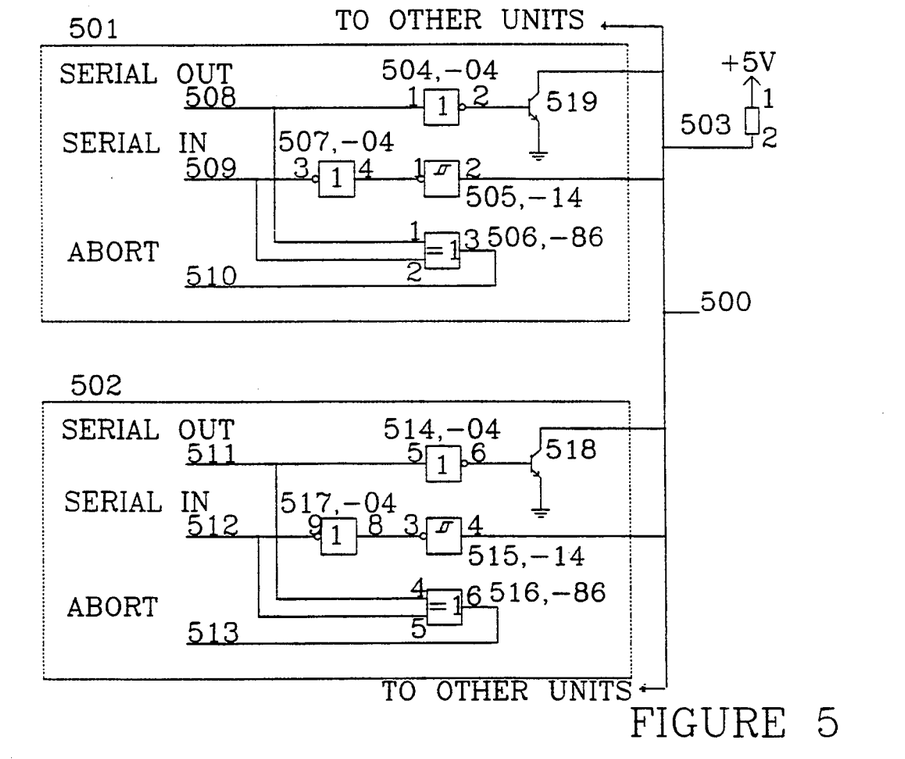
FIG. 5 shows the configuration of drive circuits for obtaining a dominant level utilised for the priorirising function.

In FIG. 5 electronics are drawn which allow dominant bits to be transmitted. A unit 501 will correspond to unit 219 and 502 to 229. The resistor 503 can be externally mounted or can form part of each unit. The adapting elements 219, 229, 239 of the units can be of the same or have different configuration as long as they meet the electrical specifications for transmission of the two 1/0 levels. Certain of the parts in unit 501 can be inbuilt in 213. The unit 501 can also contain optocouplers and/or transformers in order to provide DC isolation between the communication arrangement 500 and the electronics of the unit. When the output 508 from 501 is a 1, transistor 519 is closed and the signal in the communication arrangement 500 will be 1 (high) due to the fact that the resistor 503 is coupled to +5 V.

When a unit transmits 0, the transistor will open and drop the level of 500 to 0 depending on how many units are transmitting a 1 at the same time. Due to the inverting function of the transistor, there is an inverter between 508 and 519 so that 500 and 508 will receive the same logic level. The logic function 501 is an input with Schmitt trigger which suppresses small disturbances so that a stable logic level can be obtained. The logic function is inverting which is why it is followed by an inverter so that the logic levels on transmission will be the same at 500, 508, 509. The logic function 506 is such that it provides a logical 1 output at 510 when the signals 508, 509 have the same logic level. This signal can be used for indicating that a unit with higher priority is transmitting during priorirising. This happens when the unit transmits a one in priority field 302 and at the same time one or more other units transmit a zero. In this case there will be a logical 1 at 508 and a logical 0 at 509 which provides a logical 0 at 510, which indicates that a higher-priority unit is transmitting. The logic to which the signal will be coupled will in this case break off the transmission at 508, that is to say the level will remain at logic level 1. If the logic level at 510 should become low in field 303 and subsequent, this indicates that errors in the transmission have occurred. In contrast, the level 510 will go low in the last bit in field 307 as indication that the message has been received.

Figure 6:
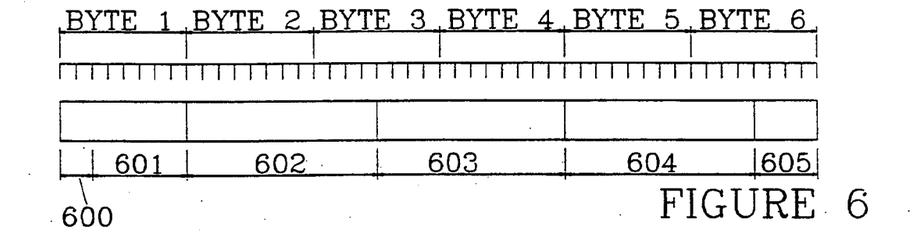
FIG. 6 shows data which are transmitted when a first statement is coupled to a message for an individual unit.

FIG. 6 describes another variant of second statements so that a coupling together between transmitter and receiver of first statements is possible. The prerequisite for this is that there is a number of variables in the transmitting unit which can be transmitted as first statements and that there are variables in the receiver which can receive these transmitted first statements. For it to be possible for second statements to be directed to a specific unit, they must have a unique address.

The format of this type of second statements has a similar configuration to the second statements described in FIG. 4. The same message can be used since a distinction can be made when the content in 400, 600 separates out these different second statements. Data in 601 suitably have the same information as 403.

It will be described first how a variable for transmission can be coupled to a message as first statement. In this case, 600 specifies a description of transmission of first statements which will be described. The 12-bit 602 gives a number between 0 and 4095 which specifies which unit will receive these second statements. After that comes 12-bit 603 with a number between 0 and 4095 which specifies which outgoing variable will be transmitted with this message. Last are 12 bits which specify which message will be used in transmission of these first statements with data of variables.

After that, all those which need these first statements will be coupled to this message. This is done by transmitting a message with second statements where 600 now specifies that a description of reception of first statements will be described.

Field 602 specifies, as in the case above, which unit is affected by these second statements. This is followed by a field 603 which specifies which internal variable first statements of the message will be coupled to. Lastly, there is 12-bit 604 which specifies the message with which these first statements will be transmitted. All units which require the same first statements must be able to know which message is transmitting them. This is done by the message above being transmitted with second statements the same number of times as there are units affected and where the unit is specified in field 602. In a case with receiver, 601 has no function.

The information items described above can be pre-programmed in all units except when transmission of second statements requires only one message with associated second statements to be defined at the start of the system. The information items then only need to be located in the master.

In certain applications it is important to be able to organise a system dynamically, that is to say it should be possible for components and functions to be implemented in a development phase and/or for the system to be completed afterwards and/or it should be possible to use the incorporated connected units in different systems without the necessity for reprogramming. The invention makes it possible that the information items needed for the system can be created when the system is started up.

A dynamically connected unit means a unit which, from the beginning, does not receive or transmit messages but a predetermined message with second statements. This can be a physical unit, that is to say that a unit is connected by a contact to the communication line, or a logical unit, that is to say, a function which is located in a physical unit, but is not utilised earlier. For example, one can imagine a robot work station, in which a robot machines different objects. It can then be such that the robot is not normally moved sideways without its degree of freedom being locked. This is exemplified by 103, 106. There is then no reason to allow this function to be kept and load the communication arrangement.

At a certain time or in a certain mode, it can occur that an object to be machined needs to be moved sideways. The master can then dynamically start a function point for sideways movement and create the messages which are required for necessary first statements to be transmitted, such as the desirable sideways positions. When the sideways movement is initiated, the locking of this movement can be released and the robot has received a new function point in the system.

This describes a dynamic connection of a logic unit. This unit is called logic since the unit as such was physically connected from the start but was not installed in the system since its function was not necessary to release the earlier statements. Naturally, it may also be possible to close off a function point and its message when the first statements are no longer needed for the work tasks set. There can be several such function units in one and the same physical unit. In a case belonging to this category, it may be desirable for such a logical function element to operate whilst the other function elements are decoupled from their tasks. Due to the fact that a master carries out this allocation of messages for transmission of first statements, the master can see to it that these new messages are not used earlier. In the most advanced case, this connection can occur at the same time as the robot utilises the same communication arrangement for controlling the robot while it is machining the previous object.

The next example describes a physical connection of a function element. The same robot is used as a basis but in this case, the controlled functions are located in the carriage which advances the workpiece, exemplified by 115, 102, to the robot. It can be imagined that the object must rotate synchronously with the movement of the robot during the work cycle of the robot. This problem can be solved by there being a connection point 122 from the robot where the communication line can be coupled to external units. Naturally, the communication must be protected from interference, in the case of a connection, even if the communication arrangement itself can reject noisy transmissions by means of the CRC sum. Since the external unit is physically connected, it must be provided with information about how statements to and from the unit will be transmitted in the communication arrangement. This is done through the logic connection according to the illustrative embodiment.

The last example shows one of the advantages with the configuration according to the invention. Said carriage, which is capable of rotating the workpiece, can be imagined to be coupled to two or more different robots. Messages with associated second statement(s) are the only thing which needs to be known in advance for all the units which will be connected in such a system. After that, however, different messages can be used in each system for transferring first statements.

Figure 7:
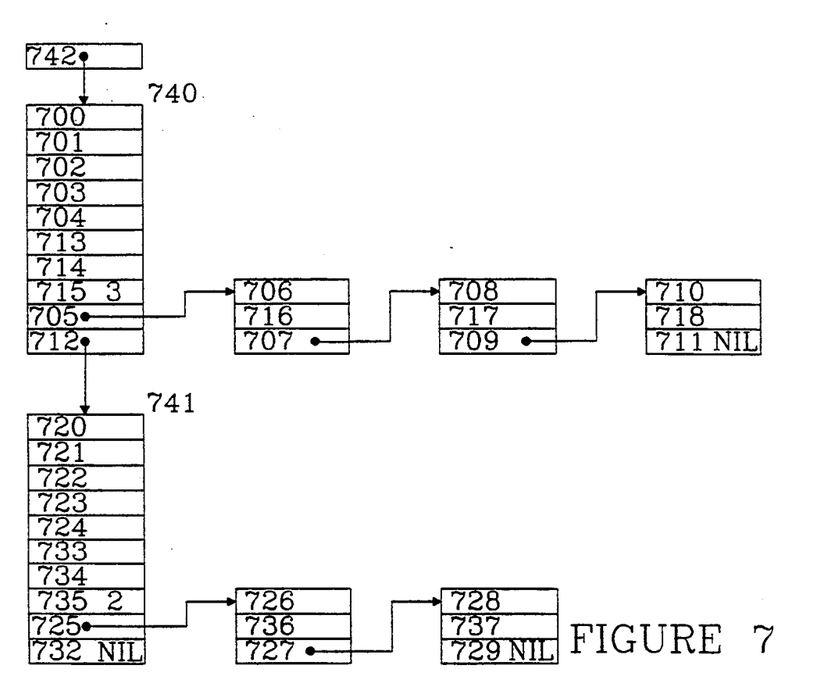
FIG. 7 shows a block diagram of data which are utilised in a higher-level unit (master) in order to keep control of which message will be used for the different statements. Such a set of data is utilised for each first statement (variable) when complete control is present.

So that the master will able to organise the system, it must include and operate with a table according to FIG. 7 by means of which table it keeps a check on which messages the first statements are to be transmitted with. This table is necessary for being able to create couplings of first statements to a message at the start-up with second statements according to FIG. 6. If all messages are defined at the start of the system, it is sufficient with a table, according to FIG. 9, for the master to be able to manage the reprioritising. In the latter case, there must be a possibility for carrying out a system restart so that the basic setting can be obtained.

Said table also contains such statements so that the master can carry out reprioritising if this is necessary.

Initiation of reprioritising can be done either by the "master" studying the data flow in the communication arrangement and checking that messages occur with specified intervals or that an affected unit informs the master if it does not receive the information within a specified time.

Most likely, several first statements will be transferred. This requires that there is a list of all these first statements and data on their configuration 740, 741. Register 742 contains statements where this list begins. Part 740 is a collection of registers which contains statements around a first statement. Register 700 contains an identification number of these first statements which are described by 740. Register 701 contains information on which message is used for the occasion of these first statements. Register 702 contains the waiting time used. For a message according to FIG. 6 to be transmitted, the master must have information on several different statements. In register 703, the message is specified which is used when the system is started, and in 704 the waiting time is specified which will then be used. The unit which transmits these first statements is specified in 713 and the variable used by it internally is specified in 714. A message with first statements can be transmitted to one or more units and the number of receivers is stated in 705. Register 705 is a pointer to 706 where the first of the units receiving this message is specified and, for this, there is a statement about which internal variable is used by the unit. Following registers 706, 716, there is a register 707 as a pointer to the second unit which receives this message. In this way, a considerable number of receiving units can be coupled to the message. In the last register which specifies a receiving unit, there is a pointer 711 which specifies that this is the last one in the list. The last register 712 points to the next first statement 741 which is transmitted in the communication arrangement. This first statement has only two receivers compared with 740 which has three.

The transmitting and receiving units do not need to keep track of all these statements in FIG. 7, but they have the capability of getting hold of this information by fetching these statements via the second statements, transmitted by the communication arrangement, of the type in FIG. 6 and building up a similar table to that of the master, according to FIG. 7. The external unit, however, cannot know which variable number 700, 720, is used internally by the master since this is never transmitted by the communication arrangement. However, all units must agree with information about which message the internal input and output variables are coupled to.

In each unit, the variables, which are transmitted as first statements with a message in the communication arrangement, must have certain information for the communication and resettings to be possible. This information is described in FIG. 8 where register 801 is the internal variable number which is the one referred to in 603 in the case of coupling of a variable to a first statement of a message. Register 802 is a register which counts down in time from a set value to zero. This register is used for obtaining the required waiting time. Register 803 contains the waiting time which is transmitted by 403 or 601 and which is placed in 802 when a transmission of this variable has started. The last register 804 contains information about which message the variable is to accompany as first statement. In a receiver, only 801 is needed, 804 is there since there is no need to-handle the waiting time.

Figures 8, 9:
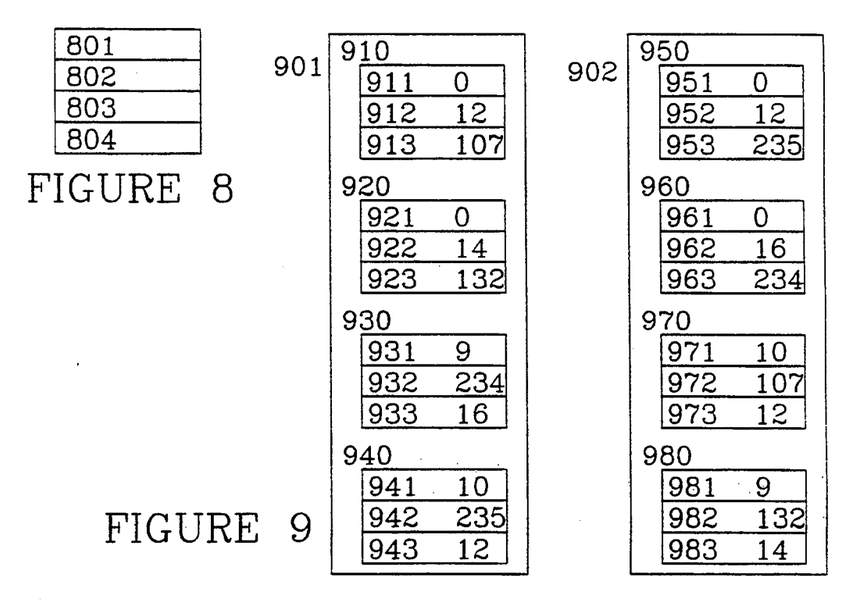

FIG. 9 describes the registers with information which is transmitted when first statements change message. These statements, for example 910, are the only thing which is needed for managing a transfer of a message. Those marked by 901 are the four blocks which are transmitted when a change occurs from mode 2 to 1. Each block 910, 920, 930, 940 contains the data which are transmitted as second statements with the message which handles a change of message. Register 911 contains the new waiting time which in this case is 0 and which will be placed in the second statement part 403. The next part 912 specifies which present message the adjustment applies to and this information will be in 401. Part 913 contains statements about which message is used hereafter and this information is placed in 402. When the four second statements are transmitted, the communication arrangement is ready to operate in mode 1. The first settings 910 and 920 are outward movements of a message from the group with high priority to a message with low priority. When the message is given low priority and no longer belongs to the group, the waiting time can be set to 0 so that no unnecessary delay occurs. The two last settings are inward movements of a message with low priority to a message with high priority within the group. When a message ends up in the group, it must also be given a waiting time between the messages to provide space for others in the group to transmit their message.

In one embodiment, it is assumed that the system is imagined to operate in several different modes and the desired mode is set by means of a knob on the control panel 131. This presupposes that all units have received information about which message is to be used for a respective first statement. In FIG. 9, there is a number of registers with information which describes the messages which will be shifted on transition from one mode to another.

Reprioritising can be done in the following manner. When the rotary switch/knob 131 is turned from position one to two, a signal goes from the control panel 132 to the master unit 101. This will then transmit, with the message allocated to the statement, the second statements which are found in registers 950, 960, 970, 980. These transmitted second statements will modify the content corresponding to that in 803, 804 which is coupled to the message which will be shifted.

Transmission with waiting time VT occurs in the following manner in unit 203. Something initiates the request that a first statement is to be sent. This can be done by means of a clock or the fact that a certain position is reached or by a digital input signal at 224. For each message there is a register 802 which the whole time counts down with time and if this register is zero, it is clear to send this message. If it is not zero the message will not be sent. This register 802 can be placed in 260 which component provides a signal to 220 or 223 which reports that 802 is now zero and that transmission can be carried out. When transmission is started, the waiting time set up is placed in 803 which is given from 403 or 601 to register 802 and a new counting down of VT in 802 can be started. When the counting down has reached zero, counting down stops and thereafter it is free to transmit.

Transmission of second statements must occur with high priority so that these are not prevented from being forwarded in the communication arrangement.

In the system in FIG. 1, such information as is needed for releasing the set statement is transmitted, for example position transmitters 107 and 112 transmit their positions, pressure transmitters 113 and 114 transmit pressure values, 101 transmits positions and angles to 103, 104 and 102 and 101 transmits commands to 118 and 119. Prioritisation of these messages must be carried out with respect to how important a message is and how quickly it must reach its receiver. In this system, it can be imagined that the brake command needs shorter transmission time since it has a safety function, with an emergency stop, each millisecond delay is one millisecond closer to a catastrophe/incident. The transmission of positions from 107 and 112 to 103 and 104 also needs short time delays since such a hydraulic system can have a wide band width which can require updating 100 to 1000 times per second. One simple way of handling delays is to increase the bit speed in the communication arrangement 100. However, this can be costly and there is always a physical limit to what is possible. It is especially difficult if the length of the communication line 100 is long, that is to say, over 1 to 20 meters. It is important that the costs of the communication arrangement are low for a distributed solution to be able to compete with conventional solutions. It is also desirable that so much information can be transmitted by one and the same communication line to keep the line costs down and to reduce the number of connections to the communication arrangement. One problem with priorirising is that it is only one message, that with the very highest priority, which is always guaranteed to proceed with maximised delay. The other messages only proceed if there is no one with higher priority transmitting. One method according to the invention describes how this can be solved by grouping these messages and every message receiving a restriction that there must always be a time gap between each sending out. This delay will be so large that all who belong to the group will succeed in sending at least one message within this time frame. If all who belong to the group with the highest priority have a higher priority than all others, it will be possible for all these messages to be transmitted within a guaranteed time frame. So that the time frame does not become so large that the function is impaired due to the increase in delay imposed by the increased time frame, the number of messages within this group must be kept to a minimum. To obtain this minimum of messages within the group, only those which by demand must really be located there can be placed in the group. This can be carried out by changing the priority level for a message so that they can be moved in and out of the group in accordance with time demands that they be within this group. The method also, quite generally, provides for producing switch-overs of first statements which can be switched over to messages which have a different priority in the system. According to the new method, there are therefore two possibilities. In the first case, a priority redistribution message is generated which specifies statements (second statements) about a new or new priority redistributions which will apply in the system. Thus, for example, a certain first statement can be bound to a first message (which thus has its order of precedence in the system). Said first statement will thereafter be given a higher priority in the system. This occurs by the first statement being coupled to an unattached message with higher priority. In the alternative embodiment of the invention, the method utilizes delay functions which specify that a message/first statement which occurred at the connection will not reoccur at the connection before a certain time interval has elapsed. Embodiments of the method specified utilizes combinations of the two alternative embodiments.

Studying the system in FIG. 1 where there are two hydraulic cylinders 106 and 111, if the system is such that only one of these is utilized at a time, only the messages which affect the operating unit need to be found in the group. This entails that the time frame can be halved without the performance being reduced. This halving of the time demand on the communication arrangement entails that, compared with a conventional system, the bit speed can be halved or the line length can be doubled while retaining performance.

The invention is not limited to the illustrative embodiments specified above but can be changed within the context of the subsequent patent claims and concept of the invention.

I claim:

1. A system for providing data communications between a plurality of measurement data generating-/receiving modules connected to a common serial communication bus, and for assigning access priority for message data structures generated by each module, comprising:

a master station connected to said serial communication bus, said master station generating one or more predefined message statements with a predefined priority for transmission to said modules, said predefined priority identifying to each connected module an access priority for each message data structure which is generated or received by a connected module;

means at each module for receiving said message statement(s) and decoding said message statement(s), said message statement(s) including priority and identification information which defines for a module the priority of a message data structure which is to be transmitted or received by said module over said serial communication bus, and identifies to other modules which may receive the message data structure the priority of said message data structure; and, transmission means at each module for obtaining access to said serial communication bus at said priority each time a respective module unit needs to transmit said message data structure.

2. The system of claim 1, wherein said master station can reassign via a message statement a new access priority for each message data structure of each module.

3. The system of claim 2, wherein said reassignment message statement has a priority higher than any other message statement and forces all of said transmit/receive modules into a receive state.

4. The system of claim 1, wherein said modules transmission means delays transmission of a message data structure depending on the priority of said message data structure, said delay being initiated following the transmission of a previous message data structure on said communication bus.

5. The system of claim 4, wherein said transmission means includes a memory for storing different delays for different data structures having different communication bus access priorities.

6. The system for providing data communications between a plurality of measurement data generating-/receiving means of claim 1, wherein said master station is computer controlled to generate priority reassignment message statements for changing the priority of message data structures to be transmitted or received by said modules when changes in the system require different priorities to be assigned to said message data structures.

7. The system according to claim 6, wherein said computer controlled master station initiates said priority assignment message statements during a start-up operation and/or during an operation phase of the system comprising said modules, and in response to a message received via a data structure transmitted by one of said modules.

8. The system according to claim 1, wherein the system comprising said modules enters a start-up phase when said master station issues a message statement which commands said modules to inhibit transmission, and which places said modules in a receive mode to decode said message statement which assigns priorities to said message structure(s) originated by said modules.

9. The system of claim 8, wherein each of said modules includes a memory identifying message data structures which can be transmitted on said bus, and include a priority indication of said message structure(s) which is updated each time said master unit reassigns priorities to said message data structure(s).

10. The system according to claim 9, wherein said statement for assigning priority includes a message statement for indicating to said modules a set of priorities to be established for said module message data structure.

11. The system according to claim 9, wherein said message statement identifies a sequence for redistributing priority assignments.

12. The system according to claim 1, wherein said master station provides in said message statement for assigning priority the identity of a message structure, and a new priority for said message structure.

13. The system according to claim 1, wherein said message statement comprises a global command for all modules which transmit or receive a specific data structure.

14. The system according to claim 1, wherein said message structures include a field containing said message structure priority.

15. A system for providing data communications between a plurality of measurement data generating/receiving modules connected to a common serial communication bus the system, comprising:
a master station connected to said serial communication bus for controlling a transmit priority of said modules to transmit a message data structure over said serial communication bus, said master station including message generating means for transmitting a delay time to each module for one or more message structures generated by said modules; and,
transmission means at each of said modules for transmitting a message structure formed at said module following said delay time which is initiated at the conclusion of a previous message transmission over said serial communication bus.

16. The system of claim 15, wherein said transmission means includes a clock mechanism for initiating a time interval corresponding to said delay time when a previous message structure has been sent on said serial communication bus and generating a transmission enable signal at the end of the time interval.

17. The system according to claim 16, further comprising means for inhibiting transmission of said transmission enable signal when a higher priority message structure is on said serial communication bus.

18. The system of claim 17, wherein each message structure transmitted over a priority for said serial communications bus includes a field identifying said message structure.

19. The system according to claim 15, wherein said delay time is related to a priority of a respective message structure which is to be sent on the bus by a module.

* * * * *